US005194271A

United States Patent [19]
Yasosky

[11] Patent Number: 5,194,271
[45] Date of Patent: Mar. 16, 1993

[54] MICROWAVEABLE BATTER-COATED, DOUGH-ENROBED FOODSTUFF

[75] Inventor: John J. Yasosky, Maple Grove, Minn.

[73] Assignee: The Pillsbury Company, Minneapolis, Minn.

[21] Appl. No.: 759,045

[22] Filed: Sep. 5, 1991

Related U.S. Application Data

[63] Continuation of Ser. No. 556,653, Jul. 20, 1990, abandoned.

[51] Int. Cl.$^5$ .................... A23L 1/31; A21D 13/00
[52] U.S. Cl. ........................... 426/92; 426/94; 426/243; 426/302; 426/552; 426/553; 426/554
[58] Field of Search ............ 426/89, 93, 94, 95, 426/96, 92, 302, 241, 243, 438, 496, 504, 512, 549, 551, 552, 553, 554, 555, 652, 653

[56] References Cited

U.S. PATENT DOCUMENTS

| | | | |
|---|---|---|---|
| 4,487,786 | 12/1984 | Junge | 426/302 |
| 4,529,607 | 7/1985 | Lenchin et al. | 426/94 |
| 4,595,597 | 6/1986 | Lenchin et al. | 426/555 |
| 4,675,197 | 6/1987 | Banner et al. | 426/292 |
| 4,744,994 | 5/1988 | Bernacchi et al. | 426/293 |
| 4,755,392 | 7/1988 | Banner et al. | 426/555 |
| 4,778,684 | 10/1988 | D'Amico et al. | 426/291 |

FOREIGN PATENT DOCUMENTS 0327332  8/1989  European Pat. Off.

OTHER PUBLICATIONS

Hawley, G. G. The Condensed Chemical Dictionary, 1981, p. 552, Van Nostrand Reinhold Co., New York.

Primary Examiner—Joseph Golian
Assistant Examiner—Leslie Wong
Attorney, Agent, or Firm—Merchant, Gould, Smith, Edell, Welter & Schmidt

[57] ABSTRACT

A high amylose flour-based dry batter mix and wet batter slurry are disclosed. The wet batter slurry mixture is capable of providing an adherent and evenly distributed coating over the surface of a dough-enrobed foodstuff, and which, after pre-frying in oil or fat and being cooked by microwave radiation, will provide an outer crust having an appealing toast color and a desired level of crispness. Also disclosed is a microwaveable pre-fried batter-coated, dough-enrobed foodstuff, the cooked product being characterized as having a cooked food filling covered by a moist, cooked dough layer and a crisp, browned outer crust layer.

20 Claims, 2 Drawing Sheets

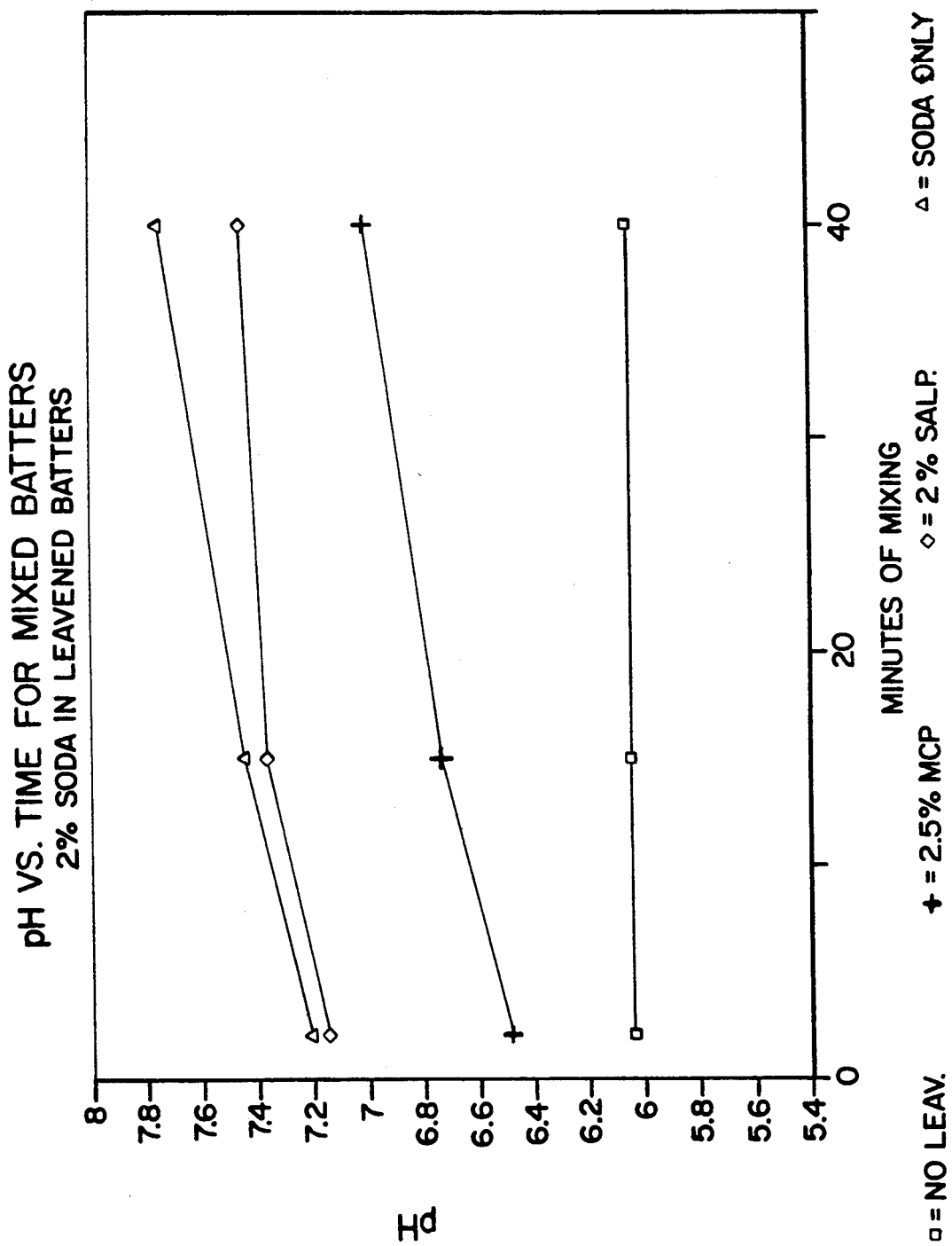

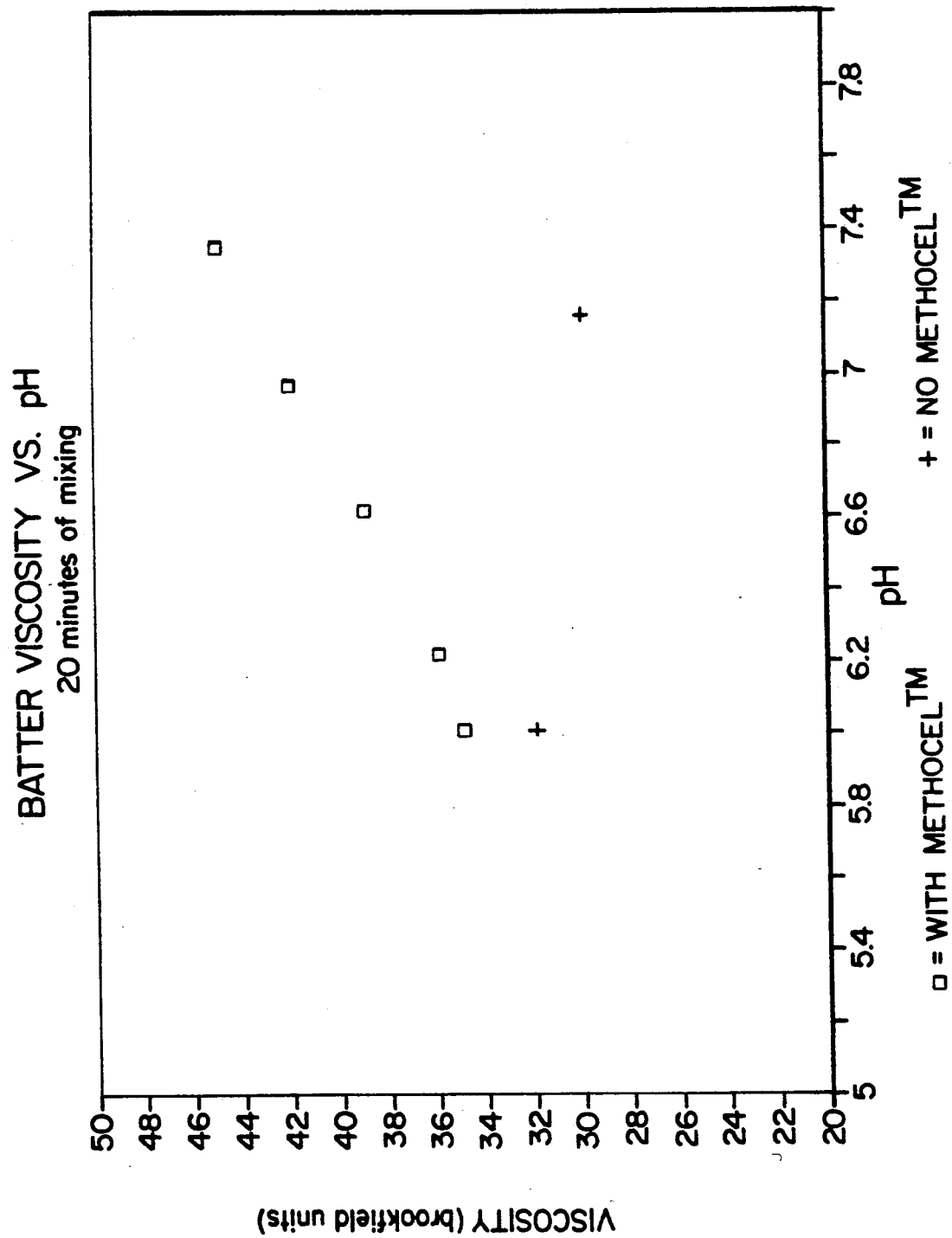

MICROWAVEABLE BATTER-COATED, DOUGH-ENROBED FOODSTUFF

This is a continuation, of application Ser. No. 07/556,653 filed Jul. 20, 1990 now abandoned.

FIELD OF THE INVENTION

The invention provides a high amylose flour-based batter composition which is capable of providing a crisp outer crust when coated onto a dough-enrobed foodstuff which is subsequently cooked by microwave radiation. The invention further provides a microwaveable pre-fried batter-coated, dough-enrobed foodstuff. More particularly, the invention provides a dough-enrobed foodstuff which is coated with a high amylose flour-based batter mixture, pre-fried, optionally frozen and cooked by microwave cooking to produce a food product having a cooked food filling covered by a moist, cooked dough layer and a crisp, browned outer crust layer.

BACKGROUND OF THE INVENTION

Batter mixes formulated to provide crispy fried products or pre-fried products when baked in an conventional oven do not produce crispy pre-fried products when the batter-coated food is microwaved instead. In conventional heating of food, for example, frying by direct flame or baking by heated air, the heat source causes food molecules to react from the surface inward thus heating successive layers in turn. As such, the outside of a foodpiece coated with a batter receives more exposure to cooking temperatures than the interior of the foodstuff and a crispy outer coating can be attained. Microwave radiation, in contrast, penetrates a foodpiece and sets water and other polar molecules in motion at the same time. Heat is generated throughout the foodpiece rather than being passed by conduction from the surface inward. As a result, the internal moisture of the foodpiece is boiled away and the steam acts to cook the entire food piece from the interior outward. This movement of moisture outward toward the surface causes an outer batter coating on a food product to be undesirably soggy and gummy. As a result, there is essentially no surface browning or crusting of the foodstuff. In cases where microwave heating is used and a browned crust is desired, microwaving must be preceded, accompanied or followed by a conventional type of heating of the foodstuff.

Many attempts have been made to formulate coatings for foodstuffs to control the moisture migration between the foodstuff and the outer coating in order to provide a foodstuff which remains crispy when microwaved. Presently, there are a number of batter compositions and methods for coating fresh and frozen foodstuffs which are later reconstituted by microwave cooking. In an attempt to retard the movement of moisture from the food portion to the breading component, and to assist in adhesion of the wet batter layer to the food substrate, several methods employ a predust layer to coat the surface of foodstuff with a dry composition. For example, U.S. Pat. Nos. 4,675,197 and 4,755,392 to Banner, et al. describe a three-component food coating composition, including a predust layer, a batter layer and a breading layer, which is applied successively to raw or precooked food. Also, U.S. Pat. No. 4,778,684 to D'Amico, et al. discloses a two-step coating for foodstuffs which involves applying a dry predust layer to the food and then coating it with an aqueous farinaceous-based and high amylose flour-containing batter mix.

Batters for coating dough-covered foodstuffs which are frozen and later reconstituted by microwave radiation or in a conventional oven have also been formulated. U.S. Pat. No. 4,744,994 to Bernacchi, et al. is directed to a method for preparing batter coated frozen comestibles by twice-coating the food with a wheat flour-shortening based batter mixture, twice-frying the foodstuff and then reconstituting it either by microwaving or baking European Patent Application No. 89300957.1 of DCA Food Industries, Inc. discloses a process for preparing a microwaveable partially pre-cooked and pre-fried food pie which is a foodstuff enwrapped by a high fat dough containing about 13 wt-% vegetable shortening, and coated with a batter slurry formulated without the use of high amylose flour.

Batters having a high amylose content have also been described. Amylose, the essentially-linear fraction of starch, has been shown to be an effective film-forming compound. As such, high amylose starch is useful in coating foodstuffs due to its ability to provide uniform films. Moreover, the film when fried aids in reducing oil absorption and provides crispness to the foodstuff as well.

Batters with high amylose content have been coated directly onto the surface of foodstuffs in an attempt to provide a crust-like coating when the foodstuff is fried and later microwaved. U.S. Pat. Nos. 4,529,607 and 4,595,597 to Lenchin, et al. disclose a high amylose flour-based batter for coating directly onto the surface of fresh and frozen foodstuffs such as fish, poultry, meat and vegetable products which are then partially cooked in oil, frozen, and subsequently cooked to completion by microwaving.

High amylose batters have been formulated for coating dough-covered foodstuffs to provide crispy crusts when subsequently fried in oil. For example, U.S. Pat. No. 4,487,786 to Junge describes coating a frozen dough-covered food product with a starch slurry comprised of high amylose corn starch, wheat flour, citric acid and water to provide a crust-like enclosure when the food product is deep fat fried. Junge discloses controlling the pH of the starch slurry with edible acid such as citric acid, a pH of between 2 and 5.5 being necessary to produce a tender crust-like enclosure. It is preferred that the slurry coated product of Junge is coated with a high melting point lipid to provide a moisture barrier.

To date, there have been no formulations of a high amylose flour-based batter coating on a dough in which a foodstuff has been enrobed, wherein the batter will provide an adherent and evenly distributed coating over the surface of the dough, and which, after pre-frying in oil, optionally frozen or subjected to frozen storage, and then cooked by microwave radiation, will result in a cooked foodstuff covered by a cooked, moist, white dough layer and an outer batter crust coating having an appealing toast color and a desired level of crispness.

Therefore, an object of the present invention is to provide a high amylose flour-based dry batter mixture which, when mixed with a liquid such as water to form a wet batter slurry, will provide an adherent and uniform film coating on a dough-enrobed foodstuff. It is a further object of the invention that the batter coating on the dough-enrobed foodstuff, when pre-fried in hot oil or fat, optionally frozen, and subjected to microwave radiation, will provide a crisp, porous, and browned outer crust on the surface of the dough-enrobed foodstuff product. Another object of the invention to provide a foodstuff filling enrobed in a flour-based dough and coated with a high amylose flour-based batter slurry, which after being pre-fried in hot oil or fat, optionally frozen, and reconstituted and/or cooked to completeness by microwave radiation, has a cooked soft, moist, white dough layer which lacks oiliness and gumminess, overlaid by a crisp, porous, browned, and appetizing outer crust.

SUMMARY OF THE INVENTION

These and other objects are achieved by the present invention which is directed to a microwaveable pre-fried batter-coated dough-enrobed foodstuff, a dry mix for a high amylose flour-based batter composition, and a method for making the batter mix and dough-enrobed foodstuff.

According to the invention, the dry batter mix composition contains an amount of high amylose flour which is effective to provide a film or layer of batter which will adhere to and uniformly coat the surface of a dough-enrobed foodstuff when the dry batter mix is combined with a liquid to produce a wet slurry mixture. When the batter-coated dough-enrobed foodstuff is subsequently pre-fried in hot oil or fat, optionally frozen or subjected to frozen storage, and then cooked by microwave radiation or other conventional means of cooking, the batter coating provides an outer crust layer over the layer of dough, the crust being crisp-textured, porous, toast-colored and otherwise not gummy.

It is preferred that the dry batter mixture contain about 30-70 wt-% high amylose flour, the weight-percentage being based on the total weight of the dry mixture. It is fur her preferred that the high amylose flour of the dry batter mix has an amylose content of at least about 50%, and most preferably about 65-70%, based on the total starch content of the high amylose flour. High amylose corn flour is highly preferred for the batter mixture although other high amylose flours may be used.

The batter mixture of the invention may also include flours which have an amylose content of less than about 50% such as wheat flour, corn flour, and rice flour. Preferably, the dry batter mixture includes about 30-70 wt-% wheat flour, about 0-30 wt-% corn flour, or a combination of wheat and corn flour.

Preferably, the batter mixture includes a chemical leavening agent. The amount of chemical leavening agent in the batter mixture is preferably about 1-16 wt-% of the total weight of the dry mixture, and more preferably about 3-6 wt-%. According to the invention, the term "chemical leavening agent" includes baking powder containing sodium bicarbonate, and the combination of one or more baking acids with sodium bicarbonate. Baking acids for chemical leavening in the batter mixture include monocalcium phosphate monohydrate (MCP), sodium aluminum sulfate (SAS), sodium acid pyrophosphate (SAPP), sodium aluminum phosphate (SALP), dicalcium phosphate (DCP), glucono delta lactone (GDL), and potassium hydrogen tartrate (cream of tartar), and mixtures thereof. One or more baking acids may combined with the sodium bicarbonate to form the chemical leavening agent. Preferably about 0.5-4 wt-% sodium bicarbonate is combined with about 0-5 wt-% monocalcium phosphate, about 0-4 wt-% sodium aluminum phosphate, and about 0-12 wt-% dicalcium phosphate, the weight percentages being based on the total weight of the dry batter mixture.

The batter mixture may also include a cellulose derivative. Hydroxypropylmethyl cellulose is the preferred cellulose derivative ingredient in the batter mixture, preferably added at about 0-2 wt-%, and most preferably about 0.8-0.9 wt-%, based on the total weight of the dry batter mixture.

According to the invention, a preferred dry batter mixture contains about 30-70 wt-% high amylose corn flour, about 30-70 wt-% wheat flour, about 0.5-4 wt-% sodium bicarbonate, about 0-4 wt-% sodium aluminum phosphate, and about 0-2 wt-% hydroxypropylmethyl cellulose, the weight percentages being based on the total weight of the dry batter mix. A highly preferred dry batter mixture contains about 45-60 wt-% high amylose corn flour, about 35-50 wt-% wheat flour, about 1-4 wt-% sodium bicarbonate, about 1-4 wt-% sodium aluminum phosphate, and about 0.8-0.9 wt-% hydroxypropylmethyl cellulose, the weight percentages being based on the total weight of the dry batter mix.

The wet batter mixture of the invention is produced by combining the dry batter mixture with sufficient liquid to form a wet batter slurry having a viscosity suitable for providing an adherent and uniform film coating on the surface of a dough-enrobed foodstuff. It is preferred that about 20-40 wt-% dry batter mixture is combined with about 60-80 wt-% liquid medium suitable to produce the wet slurry mixture, the weight percentages being based on the total weight of the wet mixture. Most preferably, about 26-30 wt-% dry batter mix is combined with about 70-74 wt-% liquid.

The invention is also directed to a foodstuff product which is a foodstuff filling enrobed in a flour-based dough, the dough-enrobed foodstuff being subsequently coated with the aforementioned high amylose flour-based batter slurry. Preferably, the dough contains a leavening agent and is low in fat content. When the batter-coated, dough-enrobed foodstuff is pre-fried and/or partially cooked in hot oil or fat, optionally frozen or subjected to frozen storage, and then cooked to doneness by microwave radiation or convention cooking methods, the batter coating produces a crisp, porous, toast-colored crust over the dough layer which, when cooked, is soft, firm and moist, white rather than grey in color, and with a lack of gumminess and oiliness. The end product foodstuff possesses taste and flavor properties that are generally acceptable to the consumer.

The foodstuff of the invention may be made by preparing the foodstuff filling, wrapping or enrobing the filling in the flour-based dough of the invention, coating the dough with the high amylose flour-based wet batter slurry as described herein, frying the foodstuff in hot oil or fat to partially fry or cook the batter and the outer surface of the dough layer, optionally subjecting the foodstuff to freezing or frozen storage, and then cooking the foodstuff to doneness using microwave radiation or conventional cooking methods.

The preferred dough mixture for the foodstuff of the invention comprises an effective amount of flour, sweetening agent, salt or salt substitute, chemical leavening agent, oil and/or shortening, emulsifying agent, and liquid. The dough should be formed, extruded or sheeted such that it will adequately cover the foodstuff filling and cook properly. Optionally, the dough may be dusted with flour or starch, for example, wheat flour or cornstarch, in order to aid in processing of the dough and/or to aid in batter adhesion to the dough-enrobed foodstuff of the invention. It is preferred that the dough be low in fat content, preferably less than about 10 wt-% fat. It is desirable that the dough when cooked will be firm, well textured, well colored (white rather than grey), lack gumminess and oiliness, and possess a mouth-feel, taste and flavor properties that are generally acceptable to the consumer.

A preferred dough mixture for the foodstuff of the invention contains about 57-69 wt-% wheat flour, about 0-3 wt-% sugar, about 0-3 wt-% salt, about 1-10 wt-% fat, about 0.5-3 wt-% baking powder and about 24-32 wt-% water, the weight percentages being based on the total weight of the formulated dough mixture. A more preferred dough mixture for the foodstuff of the invention contains about 61-62 wt-% wheat flour, about 1-2 wt-% sugar, about 1-2 wt-% salt, about 1-10 wt-% oil and/or shortening, about 0-2 wt-% emulsifier such as monoglyceride, about 1-2 wt-% baking powder, and about 28-29 wt-% water, the weight percentages being based on the total weight of the formulated dough mixture. Preferably, the baking powder contains about 30% sodium bicarbonate. It is highly preferred that the dough comprise about 5-7 wt-% oil and/or shortening and about 0.4-0.5 wt-% emulsifier. Optionally, L-cysteine and/or other dough conditioners may be added as a dough relaxer to facilitate sheeting of the dough, particularly for processing in industrial-sized equipment.

Any foodstuff which can be enrobed within the dough and cooked to doneness by microwave radiation and/or conventional cooking methods may be used as a filling for the foodstuff of the invention. A preferred filling for the dough-enrobed foodstuff is a pizza-based filling which includes such ingredients as cooked meat such as ground beef, pepperoni and sausage, cheeses such as mozzarella and cheddar, tomato-based pizza-type sauce, and spices such as salt, ground oregano, garlic powder and basil.

Optionally after pre-frying, the batter-coated foodstuff may be frozen or subjected to frozen storage for a length of time, and then cooked to doneness.

Thus, the invention is directed to a dry batter mixture and wet batter slurry mixture containing high amylose flour, the batter mixtures being capable of providing a uniform film coating over a dough-enrobed foodstuff filling, and which, when pre-fried and cooked by microwave radiation and/or conventional cooking methods, provide a crisp, porous, toast-colored outer crust layer. The invention is further directed to final food product which is a cooked, pre-fried, batter-coated, dough-enrobed foodstuff. The food product may be further described as a foodstuff filling enrobed by a dough with an outer coating made of a high amylose flour-based wet batter slurry, and being cooked partially in hot oil or fat and cooked to doneness by microwave radiation, convection heating, and/or frying. The final foodstuff product is palatable with a color, dough quality, texture, mouth-feel, lack of gumminess, and taste and flavor properties that are generally acceptable to the consumer.

BRIEF DESCRIPTION OF THE DRAWINGS

FIG. 1 is a graphical representation of the effect of leavening on the pH of the wet batter mixture as the batter is mixed over time.

FIG. 2 is a graph of the effect of pH on the viscosity of wet batter mixtures with and without the addition of hydroxypropylmethyl cellulose.

DETAILED DESCRIPTION OF THE INVENTION

The present invention provides a high amylose flour-based dry batter composition and a wet batter slurry for coating dough-enrobed foodstuffs. The batter slurry mixture of the invention is capable of providing a crisp, porous, toast brown-colored and appetizing crust when coated onto the surface of a dough-enrobed foodstuff that has been subsequently pre-fried in hot oil or fat, optionally subjected to frozen storage, and reconstituted and/or cooked to doneness by microwave or conventional cooking. The invention further provides a foodstuff product characterized as a foodstuff filling enrobed by a dough layer and coated with a high amylose flour-based wet batter mixture which, after being pre-fried in hot oil or fat and cooked to doneness by microwave radiation or conventional means of cooking, has a cooked soft, moist dough layer overlaid by a crisp, porous, browned, and appetizing outer crust.

As used herein, the term "filling" or "foodstuff filling" is any single type of foodstuff or mixture of several foodstuffs used as a filling around which dough is wrapped to form a dough-enrobed foodstuff. The term "dough-enrobed foodstuff" means a foodstuff filling around which dough has been wrapped. According to the invention, the dough-enrobed foodstuff is coated with a high amylose-based flour batter slurry to produce the "foodstuff" or "foodstuff product" which is subsequently cooked to doneness. As used herein, ranges which set forth a minimum amount of an ingredient at about zero, for example about 0-5 wt-%, means that the composition may be free of this ingredient or that the ingredient may be present in a very small or trace amount.

The dough-enrobed foodstuff of the invention is coated with a high amylose flour-based batter which, upon being pre-fried in oil or fat and cooked by microwave radiation or conventional cooking methods, provides a crisp, browned crust over a soft, moist cooked dough layer. The pre-fried foodstuff may be optionally subjected to frozen storage for a period of time prior to microwaving or cooking by conventional means.

The method of making the foodstuff of the invention generally includes the steps of preparing a foodstuff filling, optionally pre-cooking the filling, enrobing the filling in a flour-based dough, coating the dough with a high amylose flour-based wet batter slurry, partially cooking the batter-coated, dough-enrobed foodstuff by frying, optionally freezing the pre-fried foodstuff, and finally subjecting the foodstuff to microwave radiation or conventional methods of cooking to reconstitute and/or cook it to completeness.

The foodstuff filling used in the preparation of the foodstuff may be any fresh or frozen foodstuff or comestible which can be optionally subjected to frozen storage and cooked to completeness by microwave radiation or conventional cooking methods. The foodstuff filling may be in chunk or solid form, and may be prepared by chopping, dicing, grating, cooking, frying, microwaving or by any means appropriate such that the foodstuff filling may be cooked to completeness when enrobed in dough and cooked by microwave radiation. Accordingly, the filling may be optionally pre-cooked prior to being enrobed by the dough. The filling may include any sauce which is suitable for inclusion in the dough-enrobed foodstuff, for example, tomato-based sauce, cheese-based sauce, white sauces and the like. Two or more types of foodstuffs may be combined to make the filling. A preferred filling is a pizza filling which may be made, for example, from cooked ground beef and/or pepperoni and/or Italian sausage, tomato-based pizza-type sauce, mozzarella or other cheeses, modified food starch, and spices such as salt, ground oregano, garlic powder and basil.

The dough for enrobing the foodstuff filling may be prepared by combining flour with a sweetener, salt or salt substitute, a leavening agent such as baking powder or yeast, oil and/or shortening, an emulsifying agent, and liquid. The texture of the dough when cooked should be soft, moist and chewy having a soft crumb. The dough according to the invention contains an effective amount of leavening and fat such that the dough when cooked is not oily, wet or grey. It is preferred that the dough is low in fat, preferably having a fat content of less than about 10 wt-%. It is further preferred that the dough has about 0.5–3 wt-% chemical leavening agent being comprised of a baking powder that preferably contains about 30% sodium bicarbonate.

The flour used in the dough contributes to the structure of the dough and is preferably a high protein hard wheat flour, although other suitable flour such as corn flour or lower protein soft wheat flour may be used.

The sweetening agent contributes to the flavor, volume and tenderness of the dough. Sweeteners which may be used to formulate the dough include both regular and high fructose corn syrups, sucrose (cane or beet sugar) and dextrose. Sucrose and dextrose may be used singly or in combination with a corn syrup sweetener.

Leavening agents provide the dough with additional volume and textural effects. Preferably, about 0–3 wt-% chemical leavening agent, about 0–3 wt-% yeast leavening agent, or mixtures thereof, are added to the dough mixture. It is preferred that the dough contain a chemical leavening agent such as sodium bicarbonate with baking acid or baking powder. The combination of sodium bicarbonate (baking soda) with acid evolves carbon dioxide for expanding the baked product. Baking acids which may be used for chemical leavening include monocalcium phosphate monohydrate (MCP), sodium aluminum sulfate (SAS), sodium acid pyrophosphate (SAPP), sodium aluminum phosphate (SALP), dicalcium phosphate (DCP), glucono delta lactone (GDL), and potassium hydrogen tartrate (cream of tartar), and mixtures thereof. The baking acids may be combined with the sodium bicarbonate either alone or in combination. The amount of sodium bicarbonate (baking soda) used in combination with the baking acid should be balanced such that a minimum of unchanged reactants remain in the finished product. An excess amount of baking soda can impart a soapy flavor while too much acid can make the baked product bitter or tart. It is preferred that the dough contain about 0.5–3 wt-% chemical leavening agent. It is further preferred that the chemical leavening agent contain between about 0.1 to 0.9 wt-% sodium bicarbonate. Optionally, yeast may be used as the dough leavening agent alone or in combination with a chemical leavener. Suitable yeast leavening agents include instant, active dry, compressed cake or bulk slurry. The preferred amount of yeast leavening agent in the dough is about 0.5–3 wt-%, the weight percentage being based on dried yeast weight in the formulated dough mixture.

Emulsifiers are incorporated into the dough to influence the texture and homogeneity of the dough mixture, to increase dough stability, to improve eating quality, and to prolong palatability and other keeping qualities. Emulsifiers aid in the incorporation of air into the dough and its retention, and have an effect on the subdivision of the air cells so as to effect the final grain and volume of the cooked dough layer. Emulsifying agents which may be used include mono- and diglycerides of fatty acids, propylene glycol mono- and diesters of fatty acids, glyceryl-lacto esters of fatty acids, ethoxylated mono- and diglycerides, lecithin, or equivalents thereof, and mixtures thereof. Emulsifying agents may be used singly or in combination. Preferred emulsifiers include a mixture of propylene glycol mono- and diesters of fatty acids plus mono- and diglycerides and lecithin, or single mono- and diglycerides.

Oils are added to the dough mixture to impart volume and tenderness. Preferred oils include soybean, corn, canola, or other vegetable oils.

Among the optional ingredients which may be added to the dough mixture are dough relaxants, mold inhibitors (antimycotics), various enriching ingredients, and shortening. Dough relaxers such as L-cysteine, may be added to facilitate sheeting of the dough, particularly with industrial-size equipment. Mold inhibitors aid in extending the shelf life of the foodstuff product and may include sodium salts of propionic or sorbic acids, sodium diacetate, vinegar, monocalcium phosphate, lactic acid, and mixtures thereof. Enrichment nutrients which may be added to the dough include thiamine, riboflavin, niacin, iron, calcium, and mixtures thereof. Shortening, such as animal and vegetable fats and oils, may be added as a tenderizer, preservative, and to build air cell structure to provide a dough with a desirable mouth-feel.

Other ingredients which may optionally be added to the dough mixture include such seasonings, extenders, preservatives, and food colorings as desired.

According to the invention, it is preferred that the dough mixture contain about 57–69 wt-% wheat flour, about 0–3 wt-% sugar, about 0–3 wt-% salt, about 1–10 wt-% fat, about 0.5–3 wt-% baking powder and about 24–32 wt-% water, the weight percentages being based on the total weight of the dough mixture. It is more preferred that the dough comprise about 61–62 wt-% flour, about 1–2 wt-% sugar, about 1–2 wt-% salt, about 1–10 wt-% oil and/or shortening, about 0–2 wt-% emulsifier such as monoglyceride, about 1–2 wt-% baking powder and about 28–29 wt-% water, the weight percent (wt-%) of each ingredient being based on the total weight of the formulated (dry mix with liquid) dough. It is preferred that the baking powder contain about 30% sodium bicarbonate. It is highly preferred that the dough comprise about 5–7 wt-% oil and/or shortening, and about 0.4–0.5 wt-% emulsifier. Optionally, the dough may further comprise about 0.60 wt-% L-cysteine and/or other dough conditioners, and about 0.01 wt-% enriching agent, the weight percentage (wt-%) being based on the total weight of the formulated (dry mix with liquid) dough.

The dough may be prepared by mixing the dry ingredients with an amount of liquid such as water, fluid milk products or milk substitutes, or other suitable liquid medium to make a stiff but pliable dough suitable for enrobing or covering a foodstuff filling. Optionally, the dough may be dusted during preparation with a dusting agent such as flour or starch in order to aid in processing of the dough and/or to aid in batter adhesion to the dough-enrobed foodstuff of the invention. Preferred dusting agents include wheat flour and cornstarch. The dough may then be molded, extruded or sheeted to a desired thickness and dimension for enrobing the filling. The dough should be sufficiently thick to adequately cover the filling such that the filling is not easily seen through the dough yet not so thick such that the dough does not cook properly. A preferred thickness for the enrobing dough is about 1/16 to about 3/16 inch. The dough should be sized such that the foodstuff may be completely wrapped within or enrobed by the dough.

Preparation of the foodstuff of the invention may be accomplished by sheeting, extruding or molding the dough to a desired thickness and size, placing the foodstuff filling on the surface of the dough, and then wrapping the dough around the filling such that the filling is completely enwrapped by the dough. The foodstuff may be formed, for example, by hand or by using any conventional pastry maker which forms, trims, seals and crimps the dough to make a tart-like pie. The dough-enrobed foodstuff may be made into any shape. For example, the foodstuff may be semi-circular in shape made by folding a rectangular-shaped sheet of dough over the foodstuff filling so as to provide a straight edge along the fold and an about semi-circular shaped edge where the edges of the dough sheet are joined and crimped together to form a pocket-like enclosure over the foodstuff.

In preparing the dry batter composition and the wet batter slurry of the invention, the weight percentages (wt-%) of the ingredients is based on the total weight of the dry mix or aqueous slurry, whichever applies.

The batter mix is formulated with high amylose flour having a starch content of at least about 50% amylose. Amylose is the essentially-linear fraction of starch and has the potential as a film-forming compound. Coating the high amylose-based flour wet batter slurry of the invention on the surface of the above-described dough-enrobed foodstuff provides a film coating which facilitates the crisping of the outer surface of the dough upon being pre-fried in oil or fat and then cooked by microwave radiation or conventional cooking means.

Suitable high amylose-based flours that are particularly useful in the batter formulations according to the invention are those which contain about 35-45% starch having an amylose content of at least about 50%. It is highly preferred that the amylose content of the starch of the flour is about 65-70%. High amylose corn flour is preferred for formulation of the batter mixture of the invention, but high amylose flour may be derived from sources other than corn which contain at least about 50% amylose such as, for example, wheat, rice, potato, rye, oats, barley, and mixtures thereof.

The high amylose-containing flour may be combined with a flour having a starch content with lower than about 50% amylose. Suitable flours which may be combined with the high amylose-containing flour may be derived, for example, from wheat, corn, potato, rye, oats, rice, barley, and mixtures thereof. Of the total amount of flour used in the dry batter mix, it is preferred that the amount of high amylose flour is within the range of about 30-70 wt-%, and most preferably between about 45-60 wt-%. The amount of wheat flour used in combination with the high amylose flour is preferably about 30-70 wt-% of the dry mix, and most preferably about 35-50 wt-%. It is preferred that when corn flour is combined with the high amylose flour that the amount of corn flour is about 0-30 wt-% of the dry mix, and most preferably about 0-10 wt-%.

The batter composition may further include a chemical leavening agent such as baking power, or sodium bicarbonate in combination with one or more baking acids. The chemical leavener causes the batter to expand thus providing the batter with additional volume and texture such that a crisp, porous coating on the dough-enrobed foodstuff is achieved.

FIG. 1 illustrates the effect of leavening on the pH of the batter as it is mixed over time. A non-leavened batter having no baking soda or baking acid, has an about constant pH of about 6.0 throughout the mixing process. A batter with only baking soda added, has a higher initial pH of about 7.2, with the pH continuing to increase as the batter is mixed and more baking soda becomes solubilized. The pH of batter mixes containing baking soda and balanced with baking acid (i.e., MCP, SALP) also increases with mixing over time, although the initial pH may be significantly lower than that of a batter with only baking soda, depending upon the activity of the baking acid which is used. It is preferred that the pH of the batter is at least about 6.0, and most preferably between about 6.4 and 8.0.

Suitable baking acids which may be used for chemical leavening in the batter include monocalcium phosphate monohydrate (MCP), sodium aluminum phosphate (SALP), dicalcium phosphate (DCP), sodium aluminum sulfate (SAS), sodium acid pyrophosphate (SAPP), glucono delta lactone (GDL), potassium hydrogen tartrate (cream of tartar), and mixtures thereof. The baking acids may be combined with the sodium bicarbonate either singly or in combination.

It is preferred that the chemical leavening agent is about 1-16 wt-% of the total weight of the dry batter composition, more preferably about 3-6 wt-%, with about 4 wt-% being a highly preferred amount. A preferred chemical leavening agent for the batter contains about 0.5-4 wt-% sodium bicarbonate, about 0-5 wt-% monocalcium phosphate (MCP), about 0-4 wt-% sodium aluminum phosphate (SALP), and about 0-12 wt-% dicalcium phosphate (DCP), the weight percentages being based on the total weight of the dry batter mix. It is highly preferred that the chemical leavening agent is about 2 wt-% sodium bicarbonate and about 2 wt-% sodium aluminum phosphate.

Preferred chemical leavening agents for the batter of the invention may include about 1.25 parts monocalcium phosphate:1 part sodium bicarbonate; about 3 parts dicalcium phosphate:1 part sodium bicarbonate; and about 1 part sodium aluminum phosphate:1 part sodium bicarbonate.

As a wet batter mix containing sodium bicarbonate is stirred over time, the pH of the mixture increases. In a batter to which there has been no cellulose derivative (i.e., hydroxypropylmethyl cellulose) added, there is shear thinning (alignment of polymers within the batter mixture) and resulting decrease in batter viscosity over time. As a result of this loss of viscosity in batter systems due to mixing, the batter weight pick-up of a foodstuff tends to vary widely. It has unexpectedly been found, however, that the addition of cellulose derivatives such as hydroxypropylmethyl cellulose and/or methyl cellulose, to the batter mix may help maintain the viscosity or thickness of the wet batter mixture. As the batter is mixed, the pH rises and the cellulose derivative acts to thicken the batter, as indicated in FIG. 2, such that a batter with a cellulose derivative loses less viscosity than a batter without that ingredient. Thus, the loss in viscosity of the batter due to shear thinning over time is offset in part and minimalized by the addition of a cellulose derivative.

Overall, an increase in pH in the batter of the invention, when the batter comprises a cellulose derivative, increases batter viscosity.

Accordingly, cellulosic material may optionally be added to the dry batter mix composition to enhance shear tolerance of the wet batter mixture and as a bulking agent or thickening agent to provide texture, homogeneity and/or stability to the batter mixture. As used in the invention, the term shear tolerance means that the wet batter mixture is capable of maintaining viscosity without becoming thinner over time. Suitable cellulose derivatives include methyl cellulose (methocel), carboxymethyl cellulose, hydroxypropylmethyl cellulose, and sodium carboxymethyl cellulose. The batter mixture preferably contains about 0-2 wt-% hydroxypropylmethyl cellulose, and most preferably about 0.8-0.9 wt-%, the weight percentages being based on the total weight of the dry batter mixture.

Other optional ingredients which may be added to the batter mixture include mold inhibitors (antimycotics), enrichment nutrients, and oil and/or shortening. Mold inhibitors aid in extending the shelf life of the foodstuff product and may include sodium salts of propionic or sorbic acids, sodium diacetate, vinegar, monocalcium phosphate, lactic acid, and mixtures thereof. Enrichment nutrients which may be added to the dough include thiamine, riboflavin, niacin, iron, calcium, and mixtures thereof. Shortening, such as animal and vegetable fats and oils, may also be added to the batter mix as a tenderizer, preservative, and to build air cell structure in the batter. When a shortening is included in the batter, it is preferred that the shortening be mixed with the dry batter ingredients in an amount of between about 1-10 wt-%.

Other ingredients which may optionally be added to the batter mixture include such seasonings, extenders, preservatives, and food colorings as desired.

A preferred dry batter mixture contains about 30-70 wt-% high amylose corn flour, about 30-70 wt-% wheat flour, about 0.5-4 wt-% sodium bicarbonate, about 0-4 wt-% sodium aluminum phosphate, and about 0-2 wt-% hydroxypropylmethyl cellulose, the weight percentages being based on the total weight of the dry batter mix. A highly preferred dry batter mixture contains about 45-60 wt-% high amylose corn flour, about 35-50 wt-% wheat flour, about 1-4 wt-% sodium bicarbonate, about 1-4 wt-% sodium aluminum phosphate, and about 0.8-0.9 wt-% hydroxypropylmethyl cellulose, the weight percentages being based on the total weight of the dry batter mix.

To form a wet batter slurry, the dry batter mix is combined with an amount of liquid such as water, fluid milk products or milk substitutes. An effective amount of liquid is added to the dry ingredients to provide a wet batter slurry having a viscosity which will effectively adhere to and provide a uniform coating on the surface of the dough. It is preferred that about 20-40 wt-% dry batter mix is mixed with about 60-80 wt-% water to form the slurry, and highly preferred that the batter slurry is formulated by combining about 26-30 wt-% dry batter mix with about 70-74 wt-% water. The slurry is kept under agitation prior to its application to the foodstuff so as to prevent settling of the ingredients.

The batter may be applied to the dough-enrobed foodstuff by dipping, spraying, pouring, or any suitable method of application. It is preferred that the excess batter is drained from the food pie. Optionally, a breaded coating which includes, for example, a caramel coloring agent or dextrose, may be applied over the batter coating to impart color to the fully cooked foodstuff and/or to affect browning. Breading crumbs may also be coated over the batter to provide a crispy or crunchy texture.

The high amylose flour-based batter slurry of the invention is capable of adhering onto the surface of a dough-enrobed foodstuff such that a uniform film coating is achieved. Upon being pre-fried in oil or fat and cooked by microwave radiation or conventional cooking methods, the batter provides a crisp, porous coating which has an attractive toast color, a texture having an acceptable mouth-feel and appearance, palatability and general consumer acceptance. The batter is capable of providing such a coating whether the batter-coated foodstuff is first subjected to frozen storage or directly cooked without freezing after being pre-fried in oil or fat.

Before cooking the batter-coated foodstuff, it is preferred that the foodstuff is pre-fried by frying in hot oil, fat or cooking oil at temperatures of about 350°-425° F., preferably 375°-395° F., for about 30-120 seconds to flash dry and/or partially cook the batter, the dough, and the foodstuff filling.

Optionally after pre-frying, the batter-coated foodstuff may be frozen, preferably at a temperature between about −10° to 0° F. Freeze-thaw testing of the foodstuff has shown it is tolerant to freeze-thaw conditions, multiple freeze-thaw cycles, and has a long shelf life in frozen storage. The foodstuff may be stored frozen for at least 8 months at −10° to 0° F. It is preferred that frozen storage of the foodstuff is up to 6 months at −10° to 0° F., and most preferably up to 3 months. The foodstuff may then be reconstituted by microwave or conventional cooking following a period of frozen storage.

The batter-coated foodstuff is preferably cooked to doneness by microwave radiation, although conventional methods of cooking such as frying by direct flame or baking by heated air may also be used. The foodstuff product of the invention is characterized as having a cooked dough layer which is not oily, soft, moist, and firm with an outer crust layer which is crispy and porous with an attractive toast coloring. The final foodstuff product is palatable with a color, dough quality, texture, mouth-feel, lack of gumminess, and taste and flavor properties that are generally acceptable to the consumer.

EXAMPLES

The following examples further illustrate the invention. They are not meant to constitute implied limitations of the scope which is fully set forth in the foregoing text.

EXAMPLE 1

Preparation of Dough-enrobed Food Pie

Foodstuff Filling. A moist pizza-type filling was prepared by mixing together about 32 wt-% mozzarella cheese, about 42 wt-% tomato-based sauce, and about 26 wt-% diced pepperoni.

Flour-based Dough. A flour-based dough was prepared for enrobing the pizza filling by combining the ingredients set forth below according to the weight-percentages indicated which are based on the total weight-percentage of the formulated (dry mix plus liquid) dough mixture.

| Dough Ingredient | wt-%[1] |
| --- | --- |
| wheat flour | 61.9 |
| sugar | 1.01 |
| salt | 1.32 |
| vegetable oil | 5.30 |
| monoglyceride | 0.43 |
| baking powder[2] | 1.35 |
| water | 28.69 |
| | 100.00 |

[1]The weight-percentage (wt-%) of the ingredients are based on the total weight of formulated (dry mix with liquid) dough.
[2]The baking powder contains about 30% sodium bicarbonate; the formulated dough contains about 0.4 wt-% sodium bicarbonate.

Forming the Food Pie. The mixed dough was sheeted to form an about 5-inch × 6-inch (about 12.7-cm × 15.25 cm) rectangle having a thickness of about ⅛ inch (0.3 cm). Approximately 135 grams of the pizza filling was placed in the center of the rectangle of dough. The dough was then folded around the filling to completely enrobe the filling and form a tart-like food pie. The dough-enrobed foodstuff was shaped into a semi-circle having a straight edge along the fold and a semi-circular crimped edge where the edges of the dough sheet were joined by crimping.

Batter Formulation. A high amylose corn flour-based dry batter mix composition was first prepared by combining the dry batter ingredients according to the weight-percentages (wt-%) as indicated, the weight percentage being based on the total weight of the dry batter mix.

| Batter Ingredient | wt-%[1] |
| --- | --- |
| High Amylose Corn Flour[2] | 56.94 |
| Wheat flour | 37.96 |
| Sodium bicarbonate | 2.00 |
| Monocalcium phosphate (MCP) | 1.25 |
| Sodium aluminum phosphate (SALP) | 1.00 |
| Hydroxypropylmethyl cellulose[3] | 0.85 |

[1]The weight-percentage (wt-%) of the ingredients are based on the total weight of dry batter mixture.
[2]MICROCRISP ™ distributed by National Starch Company.
[3]METHOCEL ™ distributed by Dow Chemical Company.

A batter slurry was then prepared by combining about 29.80 wt-% dry batter mix with about 70.20 wt-% water, the weight percentages being based on the total weight of the aqueous slurry mixture.

The dough-enrobed foodstuff was then dipped completely in the aqueous batter slurry to coat it. Excess batter was then allowed to drain from the foodstuff.

Pre-frying the Foodstuff. The batter-coated foodstuff was fried for 120 seconds on either side in partially hydrogenated vegetable cooking oil at a temperature in the range of about 355° F. Excess oil was drained from the surface of the foodstuff.

Freezing the Foodstuff. The pre-fried food pie was then packaged in plastic wrap and frozen in a refrigeration freezing unit at −10° F. for at least 24 hours.

Cooking the Foodstuff. The frozen foodstuff was removed from the freezer, placed on a paper plate, and heated from the frozen state without turning in a 700 watt microwave oven at high power for 1:45 minutes or until the internal center temperature of the foodstuff was approximately 140°–150° F. The foodstuff was then allowed to sit for about 2 minutes before being evaluated and rated.

EXAMPLE 2

Comparison of combinations of dough and batter formulations

Two dough mixtures and two batter formulations in various combinations were evaluated and rated for general consumer acceptance of the final microwaved batter-coated, dough-enrobed foodstuff product. Characteristics which were rate included palatability, color, dough quality, texture, mouth-feel, gumminess, and taste and flavor properties.

The dough mixtures were prepared by combining the ingredients as set forth in the following table.

| Dough Mixture Ingredients | (I) wt-%[1] | (I) grams | (II) wt-% | (II) grams |
| --- | --- | --- | --- | --- |
| wheat flour | 61.90 | 1857.0 | 61.10 | 1833.0 |
| shortening | — | — | 12.81 | 384.3 |
| vegetable oil | 5.30 | 159.0 | — | — |
| sugar | 1.01 | 30.3 | 0.92 | 27.6 |
| salt | 1.32 | 39.6 | 0.62 | 18.6 |
| whey | — | — | 0.92 | 27.6 |
| SAPP[2] | — | — | 0.29 | 8.7 |
| sodium bicarbonate | — | — | 0.24 | 7.2 |
| baking powder[3] | 1.35 | 40.5 | — | — |
| monoglyceride | 0.43 | 12.9 | — | — |
| water | 28.69 | 860.7 | 23.1 | 693.0 |

[1]The weight-percentage (wt-%) of the ingredients are based on the total weight of the formulated (dry mix with liquid) dough.
[2]Sodium acid pyrophosphate.
[3]The baking powder contains about 30% sodium bicarbonate; the formulated dough contains about 0.4 wt-% sodium bicarbonate.

Each of the formulated dough mixtures (dry mix plus water) were used to make a dough-enrobed foodstuff and pre-fried in oil as set forth in Example 1.

Dry batter mixes were formulated by combining the ingredients according to the following table.

| Batter Ingredients | (I) wt-%[1] | (II) wt-% |
| --- | --- | --- |
| High Amylose Corn Flour[2] | 36.0 | — |
| Wheat flour | 47.0 | 49.0 |
| Corn flour | 9.45 | 30.75 |
| Sugar | — | 8.0 |
| Salt | — | 7.0 |
| Sodium bicarbonate | 2.00 | 1.75 |
| Monocalcium phosphate (MCP) | 1.25 | — |
| Sodium aluminum phosphate (SALP) | 1.00 | 1.75 |
| Hydroxypropylmethyl cellulose[3] | 0.85 | — |
| Calcium Caseinate/Whey[4] | — | 1.75 |
| Corn starch[5] | 2.45 | — |

[1]The weight-percentage (wt-%) of the ingredients are based on the total weight of dry batter mixture.
[2]MICROCRISP ™ distributed by National Starch Company.
[3]METHOCEL ™ distributed by Dow Chemical Company.
[4]Added as a browning agent.
[5]Non-pregelled.

Each of the dry batter mix compositions were formulated into aqueous slurries of equal viscosity by mixing the dry mix with an effective amount of water. The wet mixtures were agitated continuously to prevent settling of the ingredients.

To evaluate various dough-batter combinations, each batter slurry was coated onto each of the prepared dough-enrobed foodstuffs set forth above. The batter-coated, dough-enrobed foodstuffs were then pre-fried in hot oil and microwave cooked as set forth in Example 1. The pre-fried foodstuffs were stored frozen for about 24 hours at approximately −10° F., aged by thawing for about 30 hours at about 40° F., refrozen at about 0° F. for at least 12 hours, and then cooked according to Example 1.

The dough-batter combinations were tasted and evaluated by a "blind" taste test panel. The microwave cooked foodstuff was cut perpendicular to the straight edge into two equal halves to provide a "cut edge." Also rated was the rounded "crimped edge" of the product sample. The test panel assessed the test samples according to several parameters, including crispness of the cut edge, greyness (dough color) of the cut edge, crispness of the crimped edge, dough quality, and overall consumer acceptability. Crispness was assessed based on zero (0) being a low level of crispness and 60 being highly crisp (preferred). Greyness of the cut edge (i.e., "cut edge greyness") was rated according to a scale of zero (0) being a preferred white, dry appearance (low greyness) to 60 being an undesirable dark, grey, wet, gummy appearance (high greyness). Dough quality was rated according to visual and textural (mouth-feel) acceptance, zero (0) being a low level of acceptance, and a rating of 60 being a high level of acceptance. To determine overall acceptability of a dough-batter combination, test panel members were asked whether they would purchase the product (yes-=acceptable product; no=nonacceptable), and the number of yes:no answers were set out on a percentage basis.

The following ratings were given by the team judgings of the various dough-batter combinations.

| | BATTER | | | |
|---|---|---|---|---|
| | (I) | (I) | (II) | (II) |
| | | DOUGH | | |
| Product Quality[1] | (I) | (II) | (I) | (II) |
| Cut edge crispness | 19.2 | 19.0 | 2.2 | 0.5 |
| Cut edge greyness | 22.0 | 52.2 | 18.2 | 55.0 |
| Crimp edge crispness | 23.7 | 29.0 | 8.5 | 3.5 |
| Dough quality | 42.2 | 7.7 | 28.5 | 3.2 |
| % Acceptability (Yes) by panel members | 100.0% | 0.0% | 25.0% | 0.0% |

[1]The dough-batter combination were rated by the test panel according to 0 = lowest rating, 60 = highest rating.

Results from the taste test showed that the combination of dough (I) and batter (I) produced the highest quality and most acceptable product.

EXAMPLE 3

Evaluation of leavening content of dough mixtures

A statistically designed experiment tested doughs formulated with about 0, 1, and 2 wt-% leavening agent (baking soda containing about 30% sodium bicarbonate).

| Basic Dough Mixture Ingredients | wt-%[1] |
|---|---|
| wheat flour | 62.0–61.0 |
| shortening[2] | 4.0–13.0 |
| sugar | 1.25–0.75 |
| salt | 1.75–1.25 |
| water | 22.0–31.0 |

[1]The weight-percentage (wt-%) of the ingredients are based on the total weight of formulated (dry mix with liquid) dough.
[2]Crisco ™ shortening.

Basic dough mixtures were prepared within the ranges of ingredients according to the above formulation (dry mix plus water). Exact ingredient amounts were varied according to the amounts of leavening agent and of shortening added. Doughs were formulated with about 0, 1, and 2 wt-% leavening agent (baking soda containing about 30% sodium bicarbonate) in combination with about 4, 7, 10 and 13 wt-% of vegetable shortening. More particularly, doughs were formulated having 0 wt-% leavening with about 4, 7, 10 and 13 wt-% shortening; 1 wt-% leavening with about 4, 7, 10 and 13 wt-% shortening; and 2 wt-% leavening with about 4, 7, 10 and 13 wt-% shortening. The amount of water added to the dough varied such that the same consistency of wet dough mixture was achieved with each of the formulations. Higher fat doughs tended to require a lower amount of water than did lower fat doughs.

Each of the dough portions (four with 0 wt-% leavening, four with 1 wt-% leavening, and four with 2 wt-% leavening) were made into two dough-enrobed foodstuffs as set forth in Example 1, coated with the batter slurry (I) of Example 2, and pre-fried in hot oil according to Example 1. One set of the pre-fried foodstuffs were stored frozen for about 24 hours at approximately −10° F., aged by thawing for about 30 hours at about 40° F., refrozen at about 0° F. for at least 12 hours, and then cooked according to Example 1. The other set of pre-fried foodstuffs were stored frozen for at least 24 hours at −10° F. to provide a "non-aged" sample, that is samples that were not aged by thawing, after which they were stored frozen for at least 12 hours at 0° F. before cooking by microwaving as set forth in Example 1.

Each of the foodstuffs were taste tested and evaluated by a blind taste-test panel as to crispness of the cut edge dough, greyness of the cut edge dough, crimp edge crispness, dough quality, and overall acceptability according to the rating scale as set forth in Example 2. The ratings were then averaged to arrive at a rating for a particular amount of leavening in the dough (0, 1, and 2 wt-%). The ratings were also averaged between the aged and non-aged samples.

The following ratings were given by the team judgings of the various dough mixtures. (Rating scale: 0 (low) to 60 (high)). A particular rating signifies a combined average of the four levels of shortening for the particular amount of leavening.

| | Leavening (wt-%) | | |
|---|---|---|---|
| Dough Quality[1] | 0 | 1 | 2 |
| Cut edge crispness | 27.3 | 21.9 | 20.5 |
| Cut edge greyness | 52.6 | 35.3 | 17.3 |
| Crimp edge crispness | 42.7 | 36.8 | 36.1 |
| Dough quality | 17.0 | 23.7 | 39.9 |
| % Acceptability (Yes) by panel members | 0.0 | 71.9 | 87.5 |

[1]Dough quality was rated by the test panel according to 0 = low rating, 60 = high rating.

The results of the team judgings indicate that doughs having no or low amount of leavening are more grey, produce crispier batter coating, and are lower quality and less acceptable to the consumer than doughs with a higher amount of leavening.

EXAMPLE 4

Evaluation of fat content of dough mixtures

A statistically-designed experiment included doughs formulated with shortening at about 4, 7, 10 and 13 wt-%.

| Basic Dough Mixture Ingredients | wt-%[1] |
|---|---|
| wheat flour | 62.0–61.0 |
| sugar | 1.25–0.75 |
| leavening agent[2] | 0–2.0 |
| salt | 1.75–1.25 |
| water | 22.0–31.0 |

[1] The weight-percentage (wt-%) of the ingredients are based on the total weight of formulated (dry mix with liquid) dough.
[2] The leavening agent was comprised of baking powder containing about 30% sodium bicarbonate.

Basic dough mixtures was prepared within the ranges of ingredients according to the above formulation (dry mix plus water). Exact ingredient amounts were varied according to the amounts of shortening and leavening agent added. Doughs were formulated with about 4, 7, 10 and 13 wt-% of vegetable shortening in combination with about 0, 1, and 2 wt-% leavening agent (baking soda containing about 30% sodium bicarbonate). More particularly, doughs were formulated having 4 wt-% shortening with 0, 1, and 2 wt-% leavening; 7 wt-% shortening with 0, 1, and 2 wt-% leavening; 10 wt-% shortening with 0, 1, and 2 wt-% leavening; and 13 wt-% shortening with 0, 1, and 2 wt-% leavening. The amount of water added to the dough varied such that the same consistency of wet dough mixture was achieved with each of the formulations. Higher fat doughs tended to require a lower amount of water than did lower fat doughs.

Each of the dough portions (three with 4 wt-% shortening, three with 7 wt-% shortening, three with 10 wt-% shortening, and three with 13 wt-% shortening) were made into two dough-enrobed foodstuff as set forth in Example 1, coated with the batter slurry (I) of Example 2, and pre-fried in hot oil according to Example 1. One set of the pre-fried foodstuffs were stored frozen for about 24 hours at approximately −10° F., aged by thawing for about 30 hours at about 40° F., refrozen at about 0° F. for at least 12 hours, and then cooked according to Example 1. The other set of pre-fried foodstuffs were stored frozen for at least 24 hours at −10° F. to provide a "non-aged" sample, that is samples that were not aged by thawing, after which they were stored frozen for at least 12 hours at 0° F. before cooking by microwaving as set forth in Example 1.

Each of the foodstuffs were taste tested and evaluated by a blind taste-test panel as to crispness of the cut edge dough, greyness of the cut edge dough, crimp edge crispness, dough quality, and overall acceptability according to the rating scale as set forth in Example 2. The ratings were then averaged to arrive at a rating for a particular amount of shortening in the dough (4, 7, 10 and 13 wt-%). The ratings were also averaged between the aged and non-aged samples.

The following ratings were given by the team judgings of the various dough mixtures. (Rating scale: 0 (low) to 60 (high)). A particular rating signifies a combined average of the three levels of leavening for the particular amount of shortening.

| Dough Quality[1] | Fat (wt-%) | | | |
|---|---|---|---|---|
| | 4 | 7 | 10 | 13 |
| Cut edge crispness | 17.3 | 20.3 | 26.4 | 28.5 |
| Cut edge greyness | 27.8 | 32.2 | 37.4 | 41.6 |
| Crimp edge crispness | 30.8 | 39.0 | 41.1 | 42.6 |
| Dough quality | 28.0 | 26.5 | 22.8 | 16.8 |
| % Acceptability (Yes) by panel members | 62.5 | 65.2 | 56.3 | 33.3 |

[1] Dough quality was rated by the test panel according to 0 = lowest rating, 60 = highest rating.

The results indicate that high fat doughs are more grey, produce crispier batter coating, have lower dough quality, and are less acceptable to the consumer than doughs having a lower fat content.

EXAMPLE 5

Preferred dough and batter coating combination

The following dough mixture and wet batter slurry mixture were combined to produce a dough-enrobed foodstuff product according to Example 1.

| Dough Ingredient | wt-%[1] | grams |
|---|---|---|
| wheat flour | 63.09 | 1892.7 |
| vegetable oil | 5.30 | 159.0 |
| sugar | 1.00 | 30.0 |
| salt | 1.33 | 39.9 |
| baking powder[2] | 1.35 | 40.5 |
| monoglyceride | 0.43 | 12.9 |
| water | 27.5 | 825.0 |
| | | 3000.0 |

[1] The weight-percentage (wt-%) of the ingredients are based on the total weight of formulated (dry mix with liquid) dough.
[2] The baking powder contains about 30% sodium bicarbonate; the formulated dough contains about 0.4 wt-% sodium bicarbonate.

The dough was made into a dough-enrobed foodstuff as set forth in Example 1.

| Batter Ingredient | wt-%[1] |
|---|---|
| High amylose corn flour[2] | 47.58 |
| Wheat flour | 47.57 |
| Sodium bicarbonate | 2.00 |
| Sodium aluminum phosphate (SALP) | 2.00 |
| Hydroxypropylmethyl cellulose[3] | 0.85 |

[1] The weight-percentage (wt-%) of the ingredients are based on the total weight of the dry batter mixture.
[2] MICROCRISP ™ distributed by National Starch Company.
[3] METHOCEL ™ distributed by Dow Chemical Company.

An aqueous batter slurry was formed by combining about 30.5 w% dry batter mix with about 69.5 wt-% water. The dough-enrobed foodstuff was coated with the batter slurry, and pre-fried in oil and then cooked by microwave radiation according to Example 1.

The combination of the dough coated with the batter slurry mixture provided a foodstuff product having an unexpectedly tasty and soft moist dough layer overlaid by an unexpectedly crisp-textured and toast-colored crust. The foodstuff product possessed a significantly high level of taste, flavor and overall acceptance to the consumer over other dough-batter combinations. Particularly, the cooked dough had a high rating as to color (white not grey), mouth-feel, taste and flavor, and a lack of gumminess and oiliness. The batter coating uniformly adhered to the dough, and provided a cooked coating that had a high rating as to crispness and porosity, color (toast brown color), mouth-feel, taste and flavor and lack of gumminess.

EXAMPLE 6

Comparison of Batters With Variable Amounts of Three Flours

Batters were formulated with differing amounts of wheat flour, corn flour, high amylose corn flour, and mixtures thereof.

| Batter Ingredient | wt-%[1] |
|---|---|
| FLOUR FRACTION | see below |
| Sodium bicarbonate | 2.00 |
| Sodium aluminum phosphate (SALP) | 1.00 |
| Monocalcium phosphate (MCP) | 1.25 |
| Hydroxypropylmethyl cellulose[2] | 0.85 |

[1]The weight-percentage (wt-%) of the ingredients are based on the total weight of the dry batter mixture.
[2]METHOCEL ™ distributed by Dow Chemical Company.

The dry batter mixtures were formulated with water to provide aqueous batter slurries having about the same viscosity. The eight wet batter slurry mixtures were coated onto dough-enrobed foodstuffs formulated with the dough mixture of Example 5. The eight foodstuffs were pre-fried in hot oil according to Example 1. The pre-fried foodstuffs were stored frozen for about 24 hours at approximately −10° F., aged by thawing for about 30 hours at about 40° F., refrozen at about 0° F. for at least 12 hours, and then cooked according to Example 1.

| BATTER MIXTURE FLOUR FRACTION (wt-%)[1] | | | TEST PANEL RATINGS[2] | | | |
|---|---|---|---|---|---|---|
| Corn | Wheat | HACF | cut edge crispness | crimp edge crispness | dough quality | % accept. |
| 94.9 | 0 | 0 | 3.25 | 14.50 | 10.50 | 0 |
| 0 | 94.9 | 0 | 8.25 | 22.00 | 20.50 | 25 |
| 0 | 0 | 94.9 | 22.00 | 23.75 | 37.25 | 100 |
| 61.7 | 16.6 | 16.6 | 6.25 | 16.60 | 26.50 | 75 |
| 16.6 | 61.7 | 16.6 | 11.25 | 18.80 | 28.75 | 100 |
| 16.6 | 16.6 | 61.7 | 24.75 | 27.00 | 47.25 | 100 |
| 31.63 | 31.63 | 31.63 | 8.25 | 18.75 | 35.00 | 100 |
| 9.7 | 48.25 | 36.95 | 16.75 | 22.00 | 38.75 | 100 |

[1]The weight-percentage (wt-%) of the ingredients are based on the total weight of the dry batter mixture.
[2]0 = low rating; 60 = high rating.

Each of the eight foodstuffs were taste tested and evaluated by a blind taste-test panel as to crispness of the cut edge, crimp edge crispness, dough quality, and overall acceptability according to the rating scale as set forth in Example 2.

The results of the test panel assessment indicate that batter mixtures which contain only wheat flour or only corn flour are not acceptable. The highest quality batter mixture products contain a blend of all three flours. Those mixtures which contain a relatively high level of high amylose corn flour and wheat flour provide an optimum level of crispness and quality.

The invention has been described with reference to various specific and preferred embodiments and techniques. However, it should be understood that many variations and modifications may be made while remaining within the spirit and scope of the invention.

What is claimed is:

1. A dry batter mixture, comprising:
   (a) about 30–70 wt-% high amylose flour of at least about 50% amylose based on starch content;
   (b) about 30–70 wt-% wheat flour;
   (c) about 1–16 wt-% chemical leavening agent comprising sodium bicarbonate and a baking acid; and
   (d) at least about 0.8 wt-% of cellulose derivative wherein the cellulose derivative increases batter viscosity with increasing pH; the weight percentages being based on the total weight of the dry mixture;

said dry mixture, in combination with an effective amount of liquid, being capable of producing a wet slurry mixture which is tolerant to shear thinning with mixing over time; said slurry mixture being a pH of at least about 6.4 effective to provide a film of batter which will adhere to and uniformly coat the surface of a dough-enrobed foodstuff wherein said dough comprises less than about 10 wt-% fat and from about 24 wt-% to 32 wt-% added water, and capable of providing an outer crust layer on the surface of the batter-coated, dough-enrobed foodstuff when the foodstuff is pre-fried in hot oil or fat and cooked by microwave radiation, the crust layer being crisp-textured, porous, toast-colored and otherwise not gummy.

2. The dry batter mixture of claim 1 wherein the leavening agent comprises about 0.5–4 wt-% sodium bicarbonate in combination with a baking acid selected from the group consisting of about 0–5 wt-% monocalcium phosphate, about 0–4 wt-% sodium aluminum phosphate, about 0–12 wt-% dicalcium phosphate, and any combination thereof, the weight percentages being based on the total weight of the dry batter mixture.

3. The dry batter mixture of claim 1 which further comprises up to about 30 wt-% corn flour.

4. A wet batter slurry for coating a dough-enrobed foodstuff, comprising: about 20–40 wt-% of a dry batter mixture in combination with about 60–80 wt-% liquid, the weight percentages being based on the total weight of the wet slurry; the dry batter mixture comprising:
   (a) about 30–70 wt-% high amylose flour of at least about 50% amylose based on starch content;
   (b) about 30–70 wt-% wheat flour;
   (c) about 1–16 wt-% chemical leavening agent comprising sodium bicarbonate and a baking acid; and
   (d) at least about 0.8 wt-% of cellulose derivative wherein the cellulose derivative increases batter viscosity with increasing pH; the weight percentages being based on the total weight of the dry mixture;

said dry mixture when combined with the liquid, being capable of producing a wet slurry mixture which is tolerant to shear thinning with mixing over time; said slurry mixture a pH of at least about 6.4 being effective to provide a film of batter which will adhere to and uniformly coat the surface of a dough-enrobed foodstuff wherein said dough comprises less than about 10 wt-% fat and from about 24 wt-% to 32 wt-% added water, and capable of providing an outer crust layer on the surface of the batter-coated, dough-enrobed foodstuff when the foodstuff is pre-fried in hot oil or fat and cooked by microwave radiation, the crust layer being crisp-textured, porous, toast-colored and otherwise not gummy.

5. The wet batter slurry of claim 4 wherein about 26-30 wt-% dry batter mixture is combined with about 70-74 wt-% water.

6. The wet batter slurry of claim 4 wherein the chemical leavening agent comprises about 0.5-4 wt-% sodium bicarbonate in combination with a baking acid selected from the group consisting of about 0-5 wt-% monocalcium phosphate, about 0-4 wt-% sodium aluminum phosphate, about 0-12 wt-% dicalcium phosphate, and any combination thereof, the weight percentages being based on the total weight of the dry batter mixture.

7. The wet batter slurry of claim 6 wherein the dry batter mixture further comprises up to about 30 wt-% corn flour.

8. A batter-coated, dough-enrobed foodstuff, comprising: a foodstuff filling enrobed by a flour-based dough wherein said dough comprises less than bout 10 wt-% fat and from about 24 wt-% to 32 wt-% added water and having an outer coating of a high amylose flour-based batter slurry having a pH of at least about 6.4, said dry batter mixture, comprising:
 (a) about 30-70 wt-% high amylose flour of at least about 50% amylose based on starch content;
 (b) about 30-70 wt-% wheat flour;
 (c) about 1-16 wt-% chemical leavening agent comprising sodium bicarbonate and a baking acid; and
 (d) at least about 0.8 wt-% of cellulose derivative wherein the cellulose derivative increases batter viscosity with increasing pH; the weight percentages being based on the total weight of the dry mixture;
said dry mixture, in combination with an effective amount of liquid, being capable of producing a wet slurry mixture which is tolerant to shear thinning with mixing over time; said slurry mixture being effective to provide a film of batter which will adhere to and uniformly coat the surface of a dough-enrobed foodstuff, and capable of providing an outer crust layer on the surface of the batter-coated, dough-enrobed foodstuff.

9. A batter-coated, dough-enrobed foodstuff, comprising: a foodstuff filling enrobed by a flour-based dough wherein said dough comprises less than about 10 wt-% fat and from about 24 wt-% to 32 wt-% added water and having an outer surface of a high amylose flour-based batter slurry having a pH of at least about 6.4, said wet batter slurry comprising: about 20-40 wt-% of a dry batter mixture in combination with about 60-80 wt-% liquid, the weight percentages being based on the total weight of the wet slurry; the dry batter mixture comprising:
 (a) about 30-70 wt-% high amylose flour of at least about 50% amylose based on starch content;
 (b) about 30-70 wt-% wheat flour;
 (c) about 1-16 wt-% chemical leavening agent comprising sodium bicarbonate and a baking acid; and
 (d) at least about 0.8 wt-% of cellulose derivative wherein the cellulose derivative increases batter viscosity with increasing pH; the weight percentages being based on the total weight of the dry mixture;
said dry mixture when combined with the liquid, being capable of producing a wet slurry mixture which is tolerant to shear thinning with mixing over time; said slurry mixture being effective to provide a film of batter which will adhere to and uniformly coat the surface of a dough-enrobed foodstuff, and capable of providing an outer crust layer on the surface of the batter-coated, dough-enrobed foodstuff when the foodstuff being pre-fried in hot oil or fat.

10. A batter-coated, dough-enrobed foodstuff, comprising: a foodstuff filling enrobed by a flour-based dough wherein said dough comprises less than bout 10 wt-% fat and from about 24 wt-% to 32 wt-% added water and having an outer coating of a high amylose flour-based batter slurry having a pH of at least about 6.4, said wet batter slurry comprising: about 20-40 wt-% of a dry batter mixture in combination with about 60-80 wt-% liquid, the weight percentages being based on the total weight of the wet slurry; the dry batter mixture comprising:
 (a) about 30-70 wt-% high amylose flour of at least about 50% amylose based on starch content;
 (b) about 30-70 wt-% wheat flour;
 (c) about 1-16 wt-% chemical leavening agent comprising sodium bicarbonate and a baking acid; and
 (d) at least about 0.8 wt-% of cellulose derivative wherein the cellulose derivative increases batter viscosity with increasing pH; the weight percentages being based on the total weight of the dry mixture;
said dry mixture when combined with the liquid, being capable of producing a wet slurry mixture which is tolerant to shear thinning with mixing over time; said slurry mixture being effective to provide a film of batter which will adhere to and uniformly coat the surface of a dough-enrobed foodstuff, and capable of providing an outer crust layer on the surface of the batter-coated, dough-enrobed foodstuff, and being pre-fried in hot oil or fat and cooked to doneness by microwave radiation, convection heating, frying or any combination thereof, wherein the cooked dough layer is soft, firm and moist and the outer batter coating is crisp, porous and toast-colored.

11. The dough-enrobed foodstuff of claim 10 wherein the foodstuff filling is a pizza-based filling.

12. The foodstuff of claim 10 wherein the dough mixture comprises less than about 1-10 wt-% fat, the weight percentage being based on the total weight of the formulated dough mixture.

13. The foodstuff of claim 10 wherein the dough mixture comprises about 0-3 wt-% chemical leavening agent, about 0-3 wt-% yeast leavening agent, or any combination thereof, the weight percentage being based on the total weight of the formulated dough mixture.

14. The foodstuff of claim 10 wherein the dough mixture comprises about 57-69 wt-% wheat flour, about 0-3 wt-% sugar, about 0-3 wt-% salt, about 1-10 wt-% fat, about 0.5-3 wt-% baking powder and about 24-32 wt-% water, the weight percentages being based on the total weight of the formulated dough mixture.

15. The foodstuff of claim 10 wherein the dough mixture comprises about 61-62 wt-% wheat flour, about 1-2 wt-% sugar, about 1-2 wt-% salt, about 1-10 wt-% oil or shortening, about 0-2 wt-% emulsifier, about 1-2 wt-% baking powder, and about 28-29 wt-% water, the weight percentages being based on the total weight of the formulated dough mixture.

16. The foodstuff of claim 10 wherein the dough mixture comprises about 57-69 wt-% wheat flour, about 0-3 wt-% sugar, about 0-3 wt-% salt, about 1-10 wt-% fat, about 0.5-3 wt-% yeast leavening agent, and about 24-32 wt-% water, the weight percentages being based on the total weight of the formulated dough mixture.

17. The foodstuff of claim 10 wherein the battery slurry comprises abut 20-40 wt-% of a dry batter mixture in combination with about 60-80 wt-% liquid suitable to from a wet batter slurry, the weight percentages being based on the total weight of the batter slurry, the dry batter mixture being comprised of an amount of high amylose flour and a leavening agent which, when the dry batter mixture is combined with the liquid to produce the wet batter slurry, are effective to provide a film of batter which will adhere to and uniformly coat the surface of a dough-enrobed foodstuff, and which is capable of providing an outer crust layer on the surface of the batter-coated, dough-enrobed foodstuff when the foodstuff is pre-fried in hot oil or fat and cooked by microwave radiation, the crust layer being crisp-textured, porous, toast-colored and otherwise not gummy.

18. The foodstuff of claim 10 wherein the batter slurry comprises about 20-40 wt-% of a dry batter mixture in combination with about 60-80 wt-% liquid suitable to produce a wet batter slurry, the weight percentages being based on the total weight of the batter slurry, the dry batter mixture being comprised of about 30-70 wt-% high amylose flour, about 30-70 wt-% wheat flour, about 0.5-4 wt-% sodium bicarbonate, about 0-4 wt-% sodium aluminum phosphate, and about 0-2 wt-% hydroxypropylmethyl cellulose, the weight percentages being based on the total weight of the dry batter mixture.

19. The dry batter mixture according to claim 1 wherein the cellulose derivative is selected from the group consisting of methyl cellulose, carboxymethyl cellulose, hydroxypropylmethyl cellulose, and sodium carboxymethyl cellulose.

20. The wet batter slurry according to claim 4 wherein the cellulose derivative is selected from the group consisting of methyl cellulose, carboxymethyl cellulose, hydroxypropylmethyl cellulose, and sodium carboxymethyl cellulose.

* * * * *

UNITED STATES PATENT AND TRADEMARK OFFICE
CERTIFICATE OF CORRECTION

PATENT NO. : 5,194,271

DATED : March 16, 1993

INVENTOR(S) : John J. Yasosky et al.

It is certified that error appears in the above-identified patent and that said Letters Patent is hereby corrected as shown below:

On title page, item [75], insert --Sheryl L. Stauss, Minneapolis, Kathleen A. Siegrist, Robbinsdale, -- after "Maple Grove,"

Col. 21, claim 8, line 17, "bout" should read --about--

Col. 23, claim 17, line 1, "battery" should read --batter--

Col. 23, claim 17, line 4, "from" should read --form--

Signed and Sealed this

Eighteenth Day of January, 1994

Attest:

BRUCE LEHMAN

Attesting Officer

Commissioner of Patents and Trademarks